US008072627B2

(12) United States Patent
Akita et al.

(10) Patent No.: US 8,072,627 B2
(45) Date of Patent: Dec. 6, 2011

(54) IMAGE PROCESSING APPARATUS, ENCRYPTED JOB EXECUTION METHOD THEREOF, AND RECORDING MEDIUM

(75) Inventors: Katsuhiko Akita, Amagasaki (JP);
Minako Kobayashi, Ikeda (JP);
Takehisa Yamaguchi, Ikoma (JP);
Kazuya Anezaki, Amagasaki (JP);
Eiichi Yoshida, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 12/934,563

(22) PCT Filed: Sep. 10, 2009

(86) PCT No.: PCT/JP2009/065867
§ 371 (c)(1),
(2), (4) Date: Sep. 24, 2010

(87) PCT Pub. No.: WO2010/029981
PCT Pub. Date: Mar. 18, 2010

(65) Prior Publication Data
US 2011/0026066 A1 Feb. 3, 2011

(30) Foreign Application Priority Data
Sep. 12, 2008 (JP) ................................ 2008-235630

(51) Int. Cl.
*G06F 3/12* (2006.01)
(52) U.S. Cl. ...................... 358/1.14; 358/1.15; 358/1.16; 380/278; 380/279
(58) Field of Classification Search ........ 358/1.14–1.18; 380/243–246, 278, 279
See application file for complete search history.

(56) References Cited

U.S. PATENT DOCUMENTS

2006/0136726 A1 6/2006 Ragnet et al.
2008/0034223 A1* 2/2008 Funahashi ..................... 713/193
2009/0021789 A1* 1/2009 Sugimoto .................... 358/1.16
(Continued)

FOREIGN PATENT DOCUMENTS
JP 9-247141 A 9/1997
(Continued)

OTHER PUBLICATIONS

International Search Report (PCT/ISA/210) issued on Dec. 8, 2009, by Japanese Patent Office as the International Searching Authority for International Application No. PCT/JP2009/065867.

(Continued)

*Primary Examiner* — Chan Park
(74) *Attorney, Agent, or Firm* — Buchanan Ingersoll & Rooney PC

(57) ABSTRACT

This is to provide an image processing apparatus and others capable of ensuring security by shortening the connecting time of an external recording medium when a plurality of jobs including target data pieces encrypted with shared keys and the shared keys encrypted with a user's public key are executed. A job including a target data piece encrypted with a shared key and the shared key encrypted with a user's public key are received and stored in a job storage. To execute the plurality of jobs stored therein, the encrypted shared keys included in the respective jobs are decrypted with a secret key by the external recording medium. After completely obtaining all the plurality of decrypted shared keys, the target data pieces are decrypted with their matching decrypted shared keys, and then the jobs are executed.

30 Claims, 16 Drawing Sheets

U.S. PATENT DOCUMENTS

2009/0077390 A1 * 3/2009 Cobelo et al. ............ 713/193

FOREIGN PATENT DOCUMENTS

| | | | |
|---|---|---|---|
| JP | 11-308422 | A | 11/1999 |
| JP | 2005-165912 | A | 6/2005 |
| JP | 2005-348250 | A | 12/2005 |
| JP | 2006-190271 | A | 7/2006 |

OTHER PUBLICATIONS

Written Opinion (PCT/ISA/237) issued on Dec. 8, 2009, by Japanese Patent Office as the International Searching Authority for International Application No. PCT/JP2009/065867.

* cited by examiner

| User Information | Print Data Encrypted with Shared Key | Shared Key Encrypted with Public Key |
|---|---|---|
| User A | A001 | Shared Key A001 |

FIG.5

| User Information | Print Data Encrypted with Shared Key | Shared Key | Shared Key:Encrypted/Not Encrypted with Public Key |
|---|---|---|---|
| User A | A001 | Shared Key A001 | Encrypted |
| User B | B001 | Shared Key B001 | Encrypted |
| User A | A002 | Shared Key A002 | Encrypted |

FIG.6

| User Information | Print Data Encrypted with Shared Key | Shared Key | Shared Key:Encrypted/Not Encrypted with Public Key |
|---|---|---|---|
| User A | A001 | Shared Key A001 | Not Encrypted |
| User B | B001 | Shared Key B001 | Encrypted |
| User A | A002 | Shared Key A002 | Not Encrypted |

FIG.9

| User Information | Print Data | Print Data:Encrypted/Not Encrypted with Shared Key | Shared Key | Shared Key:Encrypted/Not Encrypted with Public Key |
|---|---|---|---|---|
| User A | A001 | Not Encrypted | Shared Key A001 | Not Encrypted |
| User B | B001 | Encrypted | Shared Key B001 | Encrypted |
| User A | A002 | Not Encrypted | Shared Key A002 | Not Encrypted |

FIG.11

| User Information | Print Data | Print Data:Encrypted/Not Encrypted with Shared Key | Shared Key | Shared Key:Encrypted/Not Encrypted with Public Key | Time Elapsing From Decrypting Print Data with Shared Key |
|---|---|---|---|---|---|
| User A | A001 | Not Encrypted | Shared Key A001 | Not Encrypted | 600 |
| User B | B001 | Encrypted | Shared Key B001 | Encrypted | — |
| User A | A002 | Not Encrypted | Shared Key A002 | Not Encrypted | 660 |

FIG.14

| User Information | Job Spec Information Encrypted with Shared Key | Print Data Encrypted with Shared Key | Shared Key Encrypted with User's Public Key |
|---|---|---|---|
| User A | Store in Box | A001 | Shared Key A001 |

FIG.16

| User Information | Job Spec Information | Job Spec Information: Encrypted /Not Encrypted with Shared Key | Data | Data:Encrypted /Not Encrypted with Shared Key | Shared Key | Shared Key:Encrypted/Not Encrypted with Public Key |
|---|---|---|---|---|---|---|
| User A | Store in Box | Encrypted | A001 | Encrypted | Shared Key A001 | Encrypted |
| User B | Print | Encrypted | B001 | Encrypted | Shared Key B001 | Encrypted |
| User A | Print | Encrypted | A002 | Encrypted | Shared Key A002 | Encrypted |
| User A | Store in Box | Encrypted | A003 | Encrypted | Shared Key A003 | Encrypted |

FIG. 18

| User Information | Job Spec Information | Job Spec Information: Encrypted /Not Encrypted with Shared Key | Data | Data: Encrypted /Not Encrypted with Shared Key | Shared Key | Shared Key: Encrypted/Not Encrypted with Public Key |
|---|---|---|---|---|---|---|
| User A | Store in Box | Not Encrypted | A001 | Encrypted | Shared Key A001 | Not Encrypted |
| User B | Print | Not Encrypted | B001 | Encrypted | Shared Key B001 | Encrypted |
| User A | Print | Encrypted | A002 | Encrypted | Shared Key A002 | Not Encrypted |
| User A | Store in Box | Not Encrypted | A003 | Encrypted | Shared Key A003 | Not Encrypted |

FIG.19

IMAGE PROCESSING APPARATUS, ENCRYPTED JOB EXECUTION METHOD THEREOF, AND RECORDING MEDIUM

FIELD OF THE INVENTION

The present invention relates to an image processing apparatus such as an image forming apparatus that receives a job including an encrypted target data piece transmitted from a user terminal connected to a network, decrypts the target data piece, and executes the job about the decrypted target data piece; an encrypted job execution method of the image processing apparatus; and a computer readable recording medium having a job execution program recorded therein to make a computer of the image processing apparatus implement the encrypted job execution method.

BACKGROUND TECHNOLOGY

Conventionally, there has been known a technology to encrypt a target data piece included in a job from a security point of view, by using an external recording medium holding a public key and a secret key and having the function for decrypting data with this secret key, when the job is transmitted to an image processing apparatus, such as a MFP (Multi Function Peripheral) that is a multifunctional digital machine, from a personal computer (hereinafter will be referred to as "PC") that is a user (client) terminal connected to a network.

To explain in other words, different shared keys are generated for respective data pieces by the PC. And a target data piece is encrypted with its shared key and this shared key is encrypted with a public key of the external recording medium. The encrypted target data piece and shared key are transmitted to the image processing apparatus. When the recording medium is connected to the image processing apparatus receiving the encrypted target data piece and shared key, the encrypted shared key is decrypted by the external recording medium with a secret key thereof. With this decrypted shared key, the target data piece is decrypted, and then the job is executed.

This technology appears in concrete form in Japanese Unexamined Laid-open Patent Publication No. 2005-348250, as follows. An image processing apparatus encrypts a target data piece with a shared key, encrypts this shared key with a public key, and stores the encrypted target data piece and shared key with their connection. When the job data is printed out, the encrypted shared key is transmitted to an IC card holding a secret key, and the shared key decrypted with this secret key is obtained therefrom. With this decrypted shared key, the encrypted job data is decrypted.

SUMMARY OF THE INVENTION

Problem to be Solved by the Invention

However, in the conventional technologies described above, an encrypted shared key of a job received by the image processing apparatus, is decrypted with a secret key of the external recording medium, and with this decrypted shared key, an encrypted print data piece is decrypted, then the job is executed, and this sequence is repeated about each job. Therefore, when a user intends to transmit a plurality of jobs to the image processing apparatus to make them executed thereby, he/she is not supposed to remove the external recording medium from the image processing apparatus, until an encrypted shared key of the last job is decrypted with the secret key. This could make the connecting time of the external recording medium comparatively longer.

As a specific example thereof, paper is supplied without removing the external recording medium if a paper-out occurs while a plurality of print jobs are being executed. This could cause a theft of the external recording medium or others.

It is an object of the present invention to provide an image processing apparatus capable of ensuring security by shortening the connecting time of an external recording medium when a plurality of jobs including target data pieces encrypted with shared keys and the shared keys encrypted with a user's public key are executed.

It is another object of the present invention to provide an encrypted job execution method implemented by the image processing apparatus.

It is yet another object of the present invention to provide a computer readable recording medium having an encrypted job execution program recorded therein to make a computer of the image processing apparatus implement the encrypted job execution method.

Means for Solving Problem

According to a first aspect of the present invention, an image processing apparatus includes:
  a job receiver that receives a job including a target data piece encrypted with a shared key and the shared key encrypted with a user's public key, which is transmitted by the user via a terminal connected to a network;
  a job storage that stores the received job in itself;
  an encrypted shared key extractor that extracts from the plurality of target jobs stored in the job storage, the encrypted shared keys included in the respective target jobs;
  an external recording medium connector that removably connects to an external recording medium holding the user's public key and a secret key in itself and having the function for decrypting the encrypted shared key with the secret key;
  a decrypted shared key obtainer that transmits the plurality of encrypted shared keys extracted by the shared key extractor from the respective jobs, to the external recording medium connected to the external recording medium connector, and in return, obtains from the external recording medium, the plurality of shared keys decrypted with the secret key;
  a target data decryption portion that decrypts the target data pieces with their matching decrypted shared keys, after completely obtaining the plurality of decrypted shared keys from the external recording medium; and
  a job executor that executes the jobs including the decrypted target data pieces.

According to a second aspect of the present invention, an encrypted job execution method of an image processing apparatus includes:
  receiving a job including a target data piece encrypted with a shared key and the shared key encrypted with a user's public key, which is transmitted by the user via a terminal connected to a network;
  storing the received job in a job storage;
  extracting from the plurality of target jobs stored in the job storage, the encrypted shared keys included in the respective target jobs;
  transmitting the plurality of encrypted shared just extracted from the respective jobs, to an external recording medium holding the user's public key and a secret key in itself and having the function for decrypting the encrypted shared key with the secret key, which is removably connected to an external recording medium connector, and in return, obtaining from the external recording medium, the plurality of shared keys decrypted with the secret key;

decrypting the target data pieces with their matching shared keys, after completely obtaining the plurality of decrypted shared keys from the external recording medium; and executing the jobs including the decrypted target data pieces by a job executor.

According to a third aspect of the present invention, a computer readable recording medium having an encrypted job execution program recorded therein to make a computer of an image processing apparatus execute:

receiving a job including a target data piece encrypted with a shared key and the shared key encrypted with a user's public key, which is transmitted by the user via a terminal connected to a network;

storing the received job in a job storage;

extracting from the plurality of target jobs stored in the job storage, the encrypted shared keys included in the respective target jobs;

transmitting the plurality of encrypted shared just extracted from the respective jobs, to an external recording medium holding the user's public key and a secret key in itself and having the function for decrypting the encrypted shared key with the secret key, which is removably connected to an external recording medium connector, and in return, obtaining from the external recording medium, the plurality of shared keys decrypted with the secret key;

decrypting the target data pieces with their matching shared keys, after completely obtaining the plurality of decrypted shared keys from the external recording medium; and executing the jobs including the decrypted target data pieces by a job executor.

BRIEF DESCRIPTION OF THE DRAWINGS

FIG. 5 This is a view showing an example of a job transmitted from a client PC.

FIG. 6 This is a view showing an example of a job administration table.

FIG. 9 This is a view showing a job administration table after the job administration table of FIG. 6 is updated.

FIG. 11 This is a view showing a job administration table updated in the embodiment of FIG. 10.

FIG. 14 This is a view showing a job administration table updated in the embodiment of FIG. 13.

FIG. 16 This is a view showing an example of a job transmitted from the client PC;

FIG. 18 This is a view showing an example of a job administration table in the embodiment of FIG. 15.

FIG. 19 This is a view showing a job administration table updated in the embodiment of FIG. 15.

MODE FOR CARRYING OUT THE INVENTION

Hereinafter, one embodiment of the present invention will be described with reference to Figures.

Figure 1:
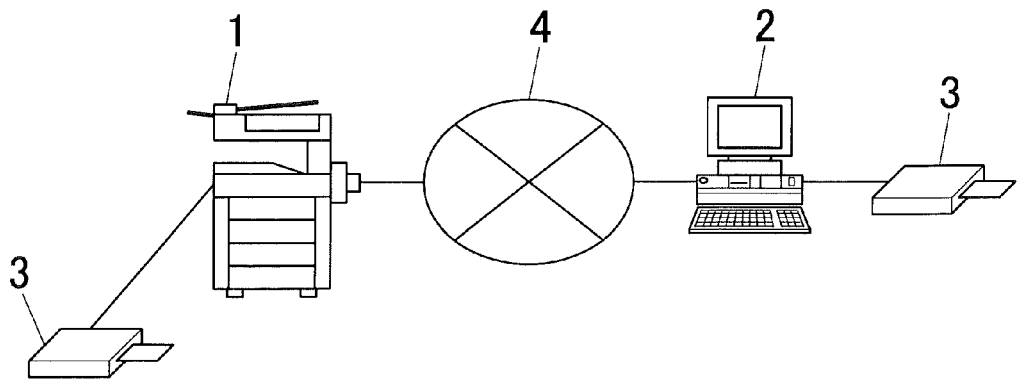
FIG. 1 This is a view showing an entire configuration of an image processing system in which an image forming apparatus according to one embodiment of the present invention is employed.

FIG. 1 is a view showing a configuration of an image processing system in which an image processing apparatus according to a first embodiment of the present invention is employed.

As shown in FIG. 1, this image processing system includes an image forming apparatus 1 as the image processing apparatus, a client PC 2 as an external terminal, and an external recording medium 3 capable of connecting to the image forming apparatus 1 and the client PC 2. And the image forming apparatus 1 and the client PC 2 are interconnected via a network 4.

In this embodiment, as the image forming apparatus 1, a MFP that is a multifunctional digital machine collectively having the copy function, the print function, the scan function, the facsimile function and other functions, is employed as described above. And in this embodiment, the jobs are print jobs for example, and not limited to print jobs. Alternatively, the jobs may be facsimile transmission jobs, data transmission jobs and other jobs.

When a user intends to have the image forming apparatus 1 execute a print job, he/she connects to the client PC 2, the external recording medium 3 that is a portable recording medium such as a USB memory, and specifies the image forming apparatus 1.

The client PC 2 generates a shared key and encrypts with this shared key, a print data piece that is a target data piece included in the print job. In the case of a plurality of print jobs, the client PC 2 generates different shared keys for the respective print jobs. Subsequently, this generated shared key is encrypted with a public key held by the external recording medium 3, and user information is given to the encrypted print data piece. And as shown in FIG. 5, the encrypted print data piece, the encrypted shared key and the not encrypted user information are consolidated into one print job and transmitted to the image forming apparatus 1. Here, the user information specifies a user (User A, in this example).

Figure 2:
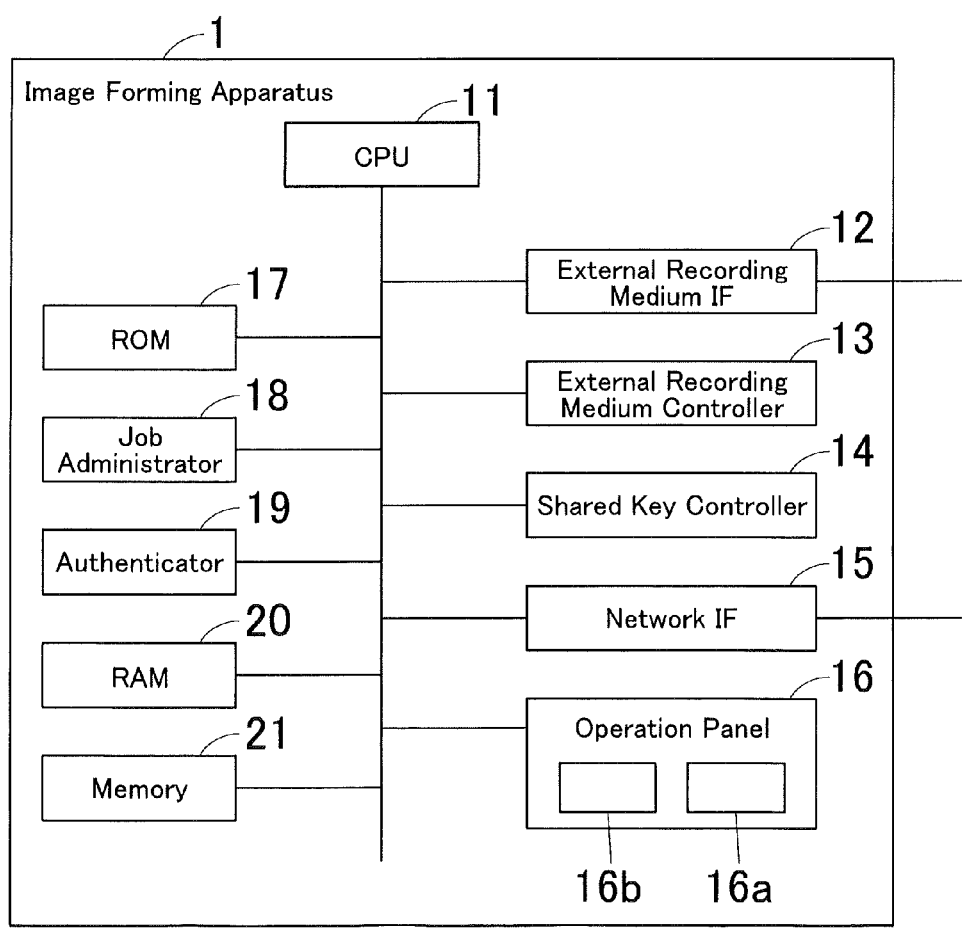
FIG. 2 This is a block diagram showing an electrical configuration of the image forming apparatus of FIG. 1.

FIG. 2 is a block diagram showing an electrical configuration of the image forming apparatus 1.

As shown in FIG. 2, the image forming apparatus 1 includes a CPU 11, an external recording medium interface (IF) 12, an external recording medium controller 13, a shared key controller 14, a network interface (IF) 15, an operation panel 16, a ROM 17, a job administrator 18, an authenticator 19, a RAM 20, and a memory 21.

The CPU 11 centrally controls all operations of the image forming apparatus 1.

The external recording medium IF 12 is a connecter to which the external recording medium 3 is removably connected.

The external recording medium controller 13 has the function for transmitting an encrypted shared key to the external recording medium 3 connected to the external recording medium IF 12 and the function for receiving a shared key decrypted by the external recording medium 3.

The network IF 15 exchanges data with external apparatuses via the network 4. In this embodiment, it serves as a job receiver that receives a job transmitted from the client PC 2.

Figure 4:
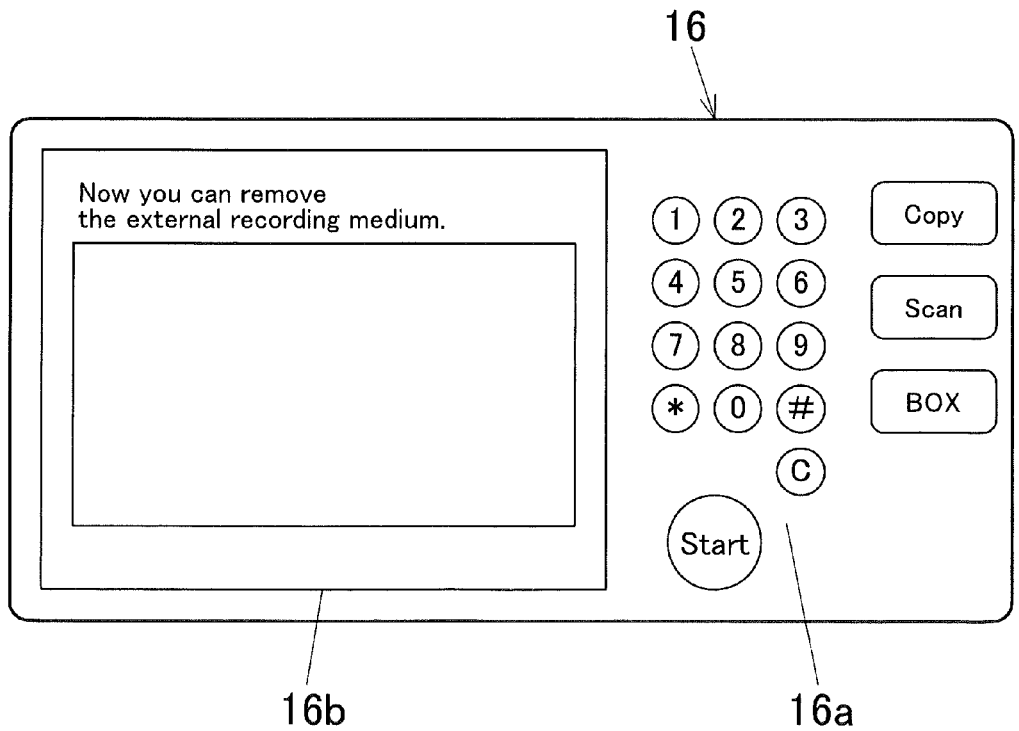
FIG. 4 This is a plain view of an operation panel of the image forming apparatus.

The operation panel 16 includes an entry portion 16a and a display 16b. As shown in FIG. 4, the entry portion 16a includes various keys such as numeric keys and a start key, and it is used to enter a user name, a password and others. The display 16b displays on itself, a permission to remove the external recording medium 3, entered information such as a user name and a password, a result of operation, and etc. In this embodiment, it is constructed of a liquid crystal display with touch panel functionality, for example.

The ROM 17 is a memory that stores in itself, an operation program for the CPU 11 and other data.

The job administrator 18 creates an administration table shown in FIG. 6 when receives a job from the client PC 2, and performs various administration operations about the received job.

In the administration table of FIG. 6, there are columns titled as "user information", "print data encrypted with shared key", "shared key" and "whether or not shared key is encrypted with public key", and those information are recorded for each job.

The authenticator 19 performs authentication to judge whether or not to permit a user who intends to use the image forming apparatus 1, to perform operations.

The RAM 20 provides an operation area for the CPU 11 to execute processing according to an operation program stored in the ROM 17.

The memory 21 is constructed of a nonvolatile recording medium such as a hard disk drive (HDD), and stores in itself data included in jobs, the job administration table of FIG. 6, various applications, and etc. A configuration may be employed, wherein the memory 21 holds an area called as a "Box" to store only the jobs including target data pieces encrypted with shared keys, and only the jobs including encrypted data pieces are collectively stored in this area.

Figure 3:
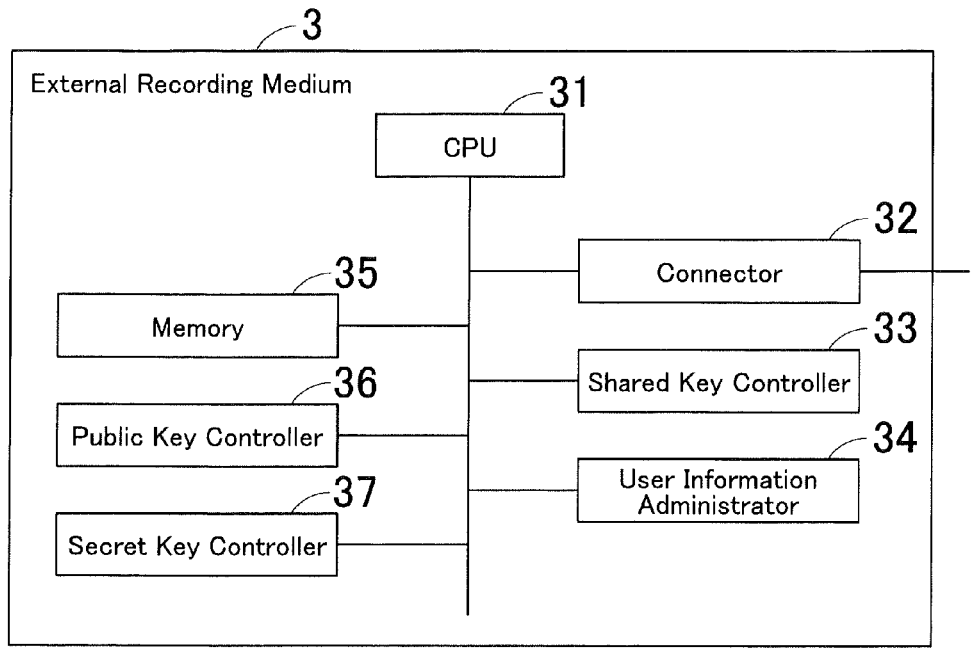
FIG. 3 This is a block diagram showing an electronic configuration of an external recording medium.

FIG. 3 shows a block diagrams showing en electrical configuration of the external recording medium 3.

As shown in FIG. 3, this external recording medium 3 includes a CPU 31, a connector 32, a shared key controller 33, a user information administrator 34, a memory 35, a public key controller 36 and a secret key controller 37.

The CPU 31 centrally controls all operations of the external recording medium 3.

The connector 32 recognizes the external recording medium 3 as being connected to the client PC 2 or the image forming apparatus 1, and being removed therefrom.

When the external recording medium 3 is connected to the client PC 2, the shared key controller 33 receives a shared key generated by the client PC 2 and transmits it to the public key controller 36, and then transmits to the client PC 2, the shared key encrypted with a public key by the public key controller 36. Meanwhile, when the external recording medium 3 is connected to the image forming apparatus 1, it receives an encrypted shared key from the image forming apparatus 1 and transmits it to the secret key controller 37, and then transmits to the image forming apparatus 1, the shared key decrypted with a secret key by the secret key controller 37.

The user information administrator 34 administers user names, passwords and others.

The memory 35 records in itself users' public keys, secret keys, user names, passwords and others.

The public key controller 36 encrypts with a public key, a shared key received from the client PC 2. The secret key controller 37 decrypts with a secret key, an encrypted shared key received from the image forming apparatus 1.

Hereinafter, procedures will be explained, wherein a job including a print data piece encrypted by the client PC 2 and others is generated and transmitted to the image forming apparatus 1, then the received print job is executed by the image forming apparatus 1.

Figure 7:
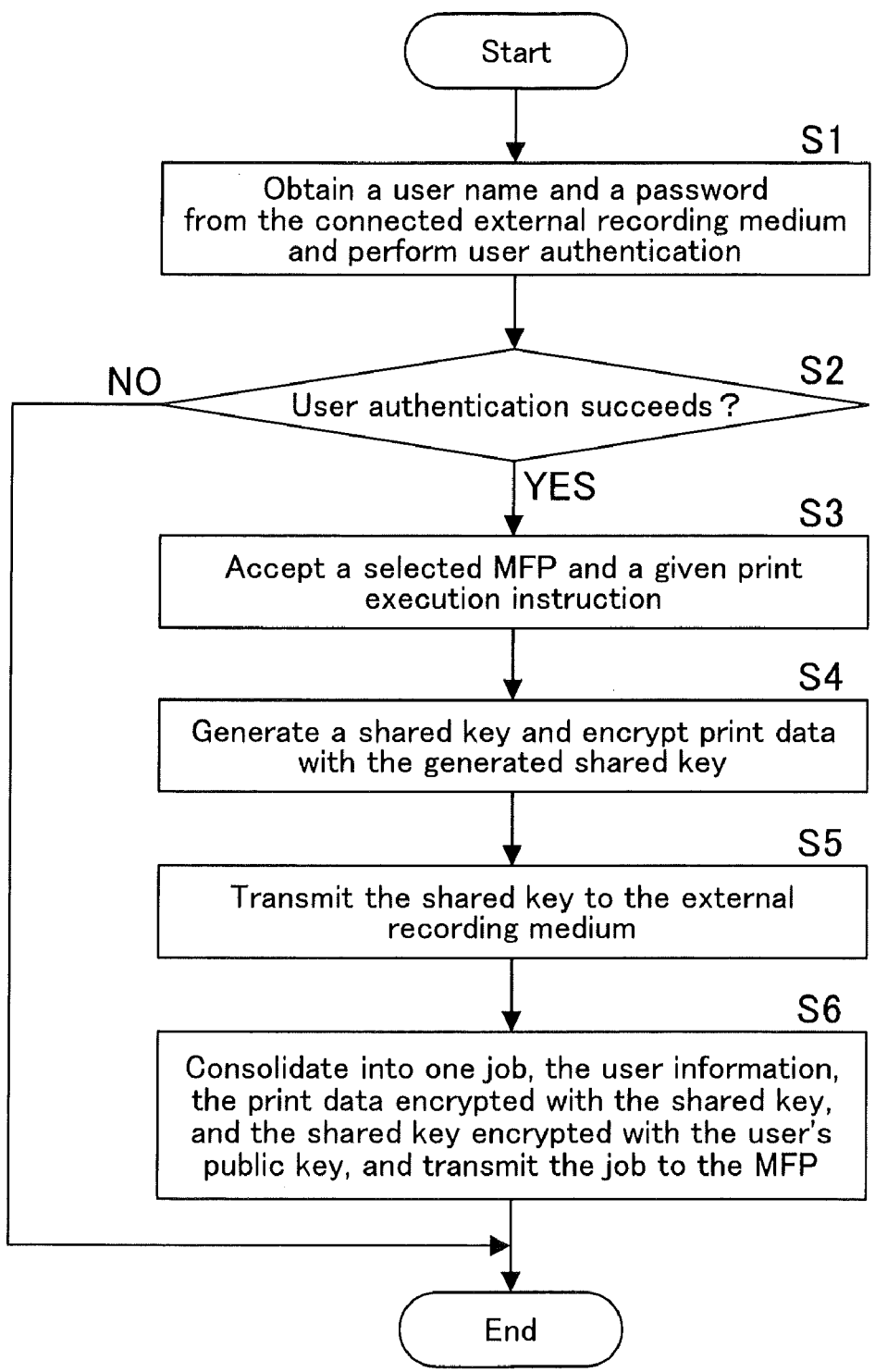
FIG. 7 This is a flowchart representing a procedure executed in the client PC.

Initially, a procedure executed in the client PC 2 will be explained with reference to a flowchart shown in FIG. 7.

A user connects the external recording medium 3 to the client PC 2. Then in Step S1, in the client PC 2, a user name and a password are obtained from the external recording medium 3 connected thereto, and user authentication is performed.

In Step S2, it is judged whether user authentication succeeds or fails. If user authentication fails (NO in Step S2), the routine immediately terminates. If user authentication succeeds (YES in Step S2), the user's selecting the image forming apparatus 1 (referred to as "MFP" in Figure) and giving an execution instruction by pressing the execute button, are accepted in Step S3.

Then in Step S4, in the client PC 2, a shared key is generated and a print data piece is encrypted with this shared key. And the shared key is transmitted to the external recording medium 3, in Step S5.

In the external recording medium 3, the shared key received from the client PC2 is encrypted with this user's public key held by the external recording medium 3 itself. And then, this encrypted shared key is returned to the client PC 2.

In Step S6, in the client PC 2, the user information, the print data piece encrypted with the shared key and the shared key encrypted with the user's public key are consolidated into one job, and the job is transmitted to the image forming apparatus 1. Then the routine terminates.

Figure 8:
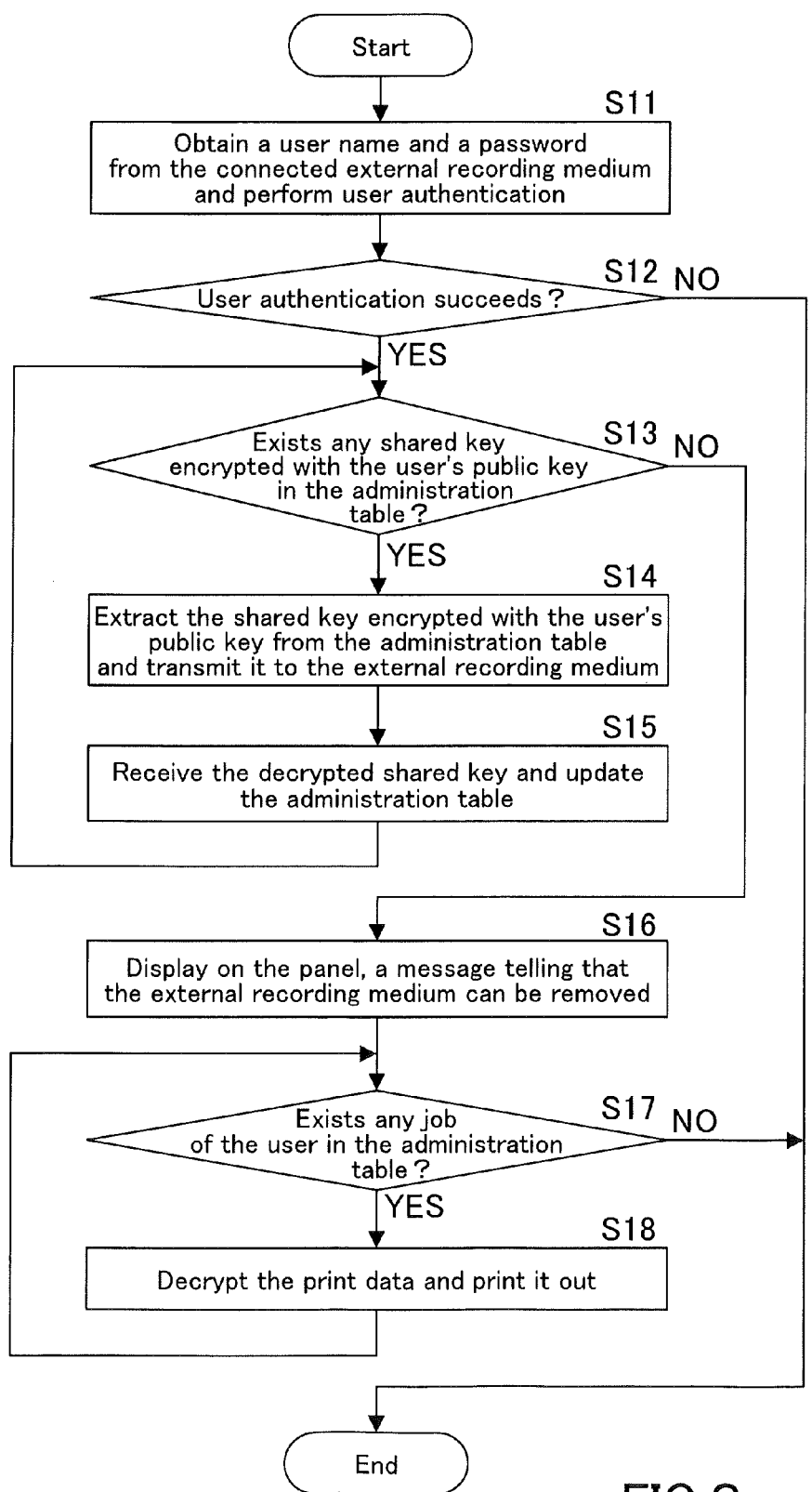
FIG. 8 This is a flowchart representing a procedure executed in the image forming apparatus.

FIG. 8 is a flowchart representing a procedure executed in the image forming apparatus 1. This procedure is executed by the CPU 11 according to an operation program recorded in a recording medium such as the ROM 17.

In the image forming apparatus 1 receiving the job from the client PC 2, information of the job is recorded in the job administration table shown in FIG. 6.

A user connects the external recording medium 3 to the external recording medium IF 12. Then in Step S11 of FIG. 9, in the image forming apparatus 1, a user name and a password are obtained from the external recording medium 3 connected to the external recording medium IF 12, and user authentication is performed. Alternatively, user authentication may be performed based on a user name and a password entered by the user via the operation panel 16.

In Step S12, it is judged whether user authentication succeeds or fails. If user authentication fails (NO in Step S12), the routine immediately terminates. If user authentication succeeds (YES in Step S12), the routine proceeds to Step S13.

In Step S13, it is judged whether or not there exists a shared key encrypted with this authenticated user's pubic key, in the job administration table. If there exists a shared key encrypted with the user's public key, in the job administration table (YES in Step S13), then in Step S14, in the image forming apparatus 1, the shared key encrypted with the user's public key is extracted from the job administration table and transmitted to the external recording medium 3. As described above, a job of an authenticated user is automatically extracted among the target jobs, and an encrypted shared key included in the extracted job is automatically obtained, which would save users the trouble of having to select a target job.

In the external recording medium 3 receiving the encrypted shared key, the encrypted shared key is decrypted with a secret key and this decrypted shared key is returned to the image forming apparatus 1.

In Step S15, in the image forming apparatus 1, the decrypted shared key is received and the job administration table is updated as shown in FIG. 9. And then, the routine goes back to Step S13 and repeats Steps S13 through S15. In this way, if there exist a plurality of jobs of the same user in the job administration table, shared keys encrypted with this user's public key, are extracted from all the jobs and transmitted to the external recording medium 3. Then the decrypted shared keys are received (obtained) and the job administration table is updated.

As shown in the updated job administration table of FIG. 9, the "print data A001 encrypted with shared key" and the "print data A002 encrypted with shared key" are included in the job records of User A. As for the both records, the data in the column "shared key: encrypted/not encrypted with public key" are changed from "encrypted" to "not encrypted". When execution of these jobs is completed, the job records are removed from the job administration table.

If all the encrypted shared keys of the user are decrypted and the job administration table is updated (NO in Step S13), then in Step S16, in the image forming apparatus 1, a message is displayed on the display 16b of the operation panel 16, as "now you can remove the external recording medium 3", as shown in FIG. 4. Thus, the user is allowed to remove the external recording medium 3.

Then in Step S17, it is judged whether or not there exists any job in the job administration table. If there exists any job in the job administration table (YES in Step S17), the print data piece is decrypted and printed out in Step S18. And then, the routine goes back to Step S17 and the decryption and print operations are repeated until there exists no job of the user in the job administration table.

If there exists no job of the user in the job administration table (NO in Step S17), the routine terminates.

As described above, when a plurality of jobs of a specific user, existing in the job administration table, are executed, encrypted shared keys are extracted from the plurality of jobs. And all these shared keys are decrypted by the external recording medium, and after that, the target data pieces are also decrypted. This means, once all the decrypted shared keys have been obtained from the external apparatus 3, the external recording medium 3 can be removed anytime, which would shorten the connecting time of the external recording medium 3. Therefore, it is only necessary for the user to remove the external recording medium 3, after all the plurality of decrypted shared keys are completely obtained from the external recording medium 3. That could eliminate the possibility that the external recording medium 3 is stolen during supplement of paper when a paper-out occurs during execution of print jobs, and ensure higher security.

Hereinafter, another embodiment of the present invention will be explained.

In the embodiment previously explained, a message telling that the external recording medium 3 can be removed is displayed on the operation panel 16, in Step S16. However, seeing this message, the user possibly removes the external recording media 3 from the image forming apparatus 1 and gets off the image forming apparatus 1 for a while, before the print data is printed out. If it is printed out in this state of things, there is a possibility that the printed content is leaked to third persons. The embodiment to be explained below is suggested to take measures to meet the situation.

Figure 10:
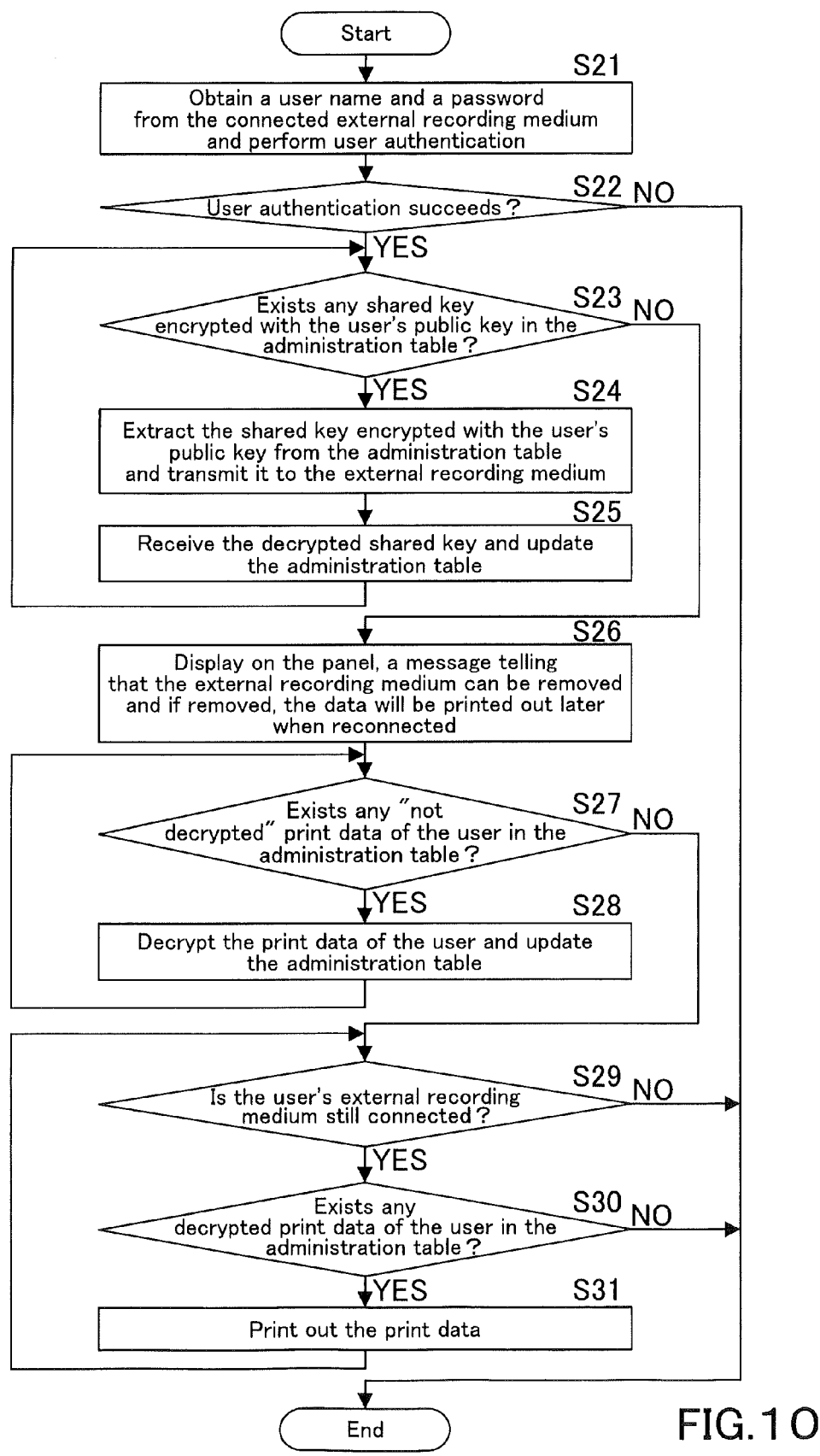
FIG. 10 This is a flowchart representing a procedure that is executed in the image forming apparatus in another embodiment of the present invention.

A procedure executed in the image forming apparatus 1 in this embodiment will be described with reference to a flowchart shown in FIG. 10. This procedure is executed by the CPU 11 according to an operation program recorded in a recording medium such as the ROM 17.

In the image forming apparatus 1 receiving the job from the client PC 2, information of the job is registered n the job administration table of FIG. 6.

In this state of things, the external recording medium 3 is connected to the external recording medium IF 12. Then in Step S21 of FIG. 10, in the image forming apparatus 1, a user name and a password are obtained from the external recording medium 3 connected to the external recording medium IF 12, and user authentication is performed based on the user information of FIG. 5, recorded in the memory 21 of the image forming apparatus 1.

In Step S22, it is judged whether user authentication succeeds or fails. If user authentication fails (NO in Step S22), the routine immediately terminates. If user authentication succeeds (YES in Step S22), the routine proceeds to Step S23.

In Step S23, it is judged whether or not there exists any shared key encrypted with this authenticated user's public key, in the job administration table. If there exits any shared key encrypted with the user's public key, in the job administration table (YES in Step S23), then in Step S24, in the image forming apparatus 1, the shared keys encrypted with the user's public keys are extracted from the job administration table and transmitted to the external recording medium 3.

In the external recording medium 3 receiving the encrypted shared keys, the respective encrypted shared keys are decrypted with a secret key and these decrypted shared keys are returned to the image forming apparatus 1.

In Step S25, in the image forming apparatus 1, the decrypted shared key is received and the job administration table is updated as shown in FIG. 11. And then, the routine goes back to Step S23 and repeats Steps S23 through S25.

As shown in the updated job administration table of FIG. 11, there is a column titled as "print data: encrypted/not encrypted with shared key". As for the job records of User A, including the "print data A001" and the "print data A002", the data in the column "print data: encrypted/not encrypted with shared key" is still "encrypted", at this stage.

Figure 12:
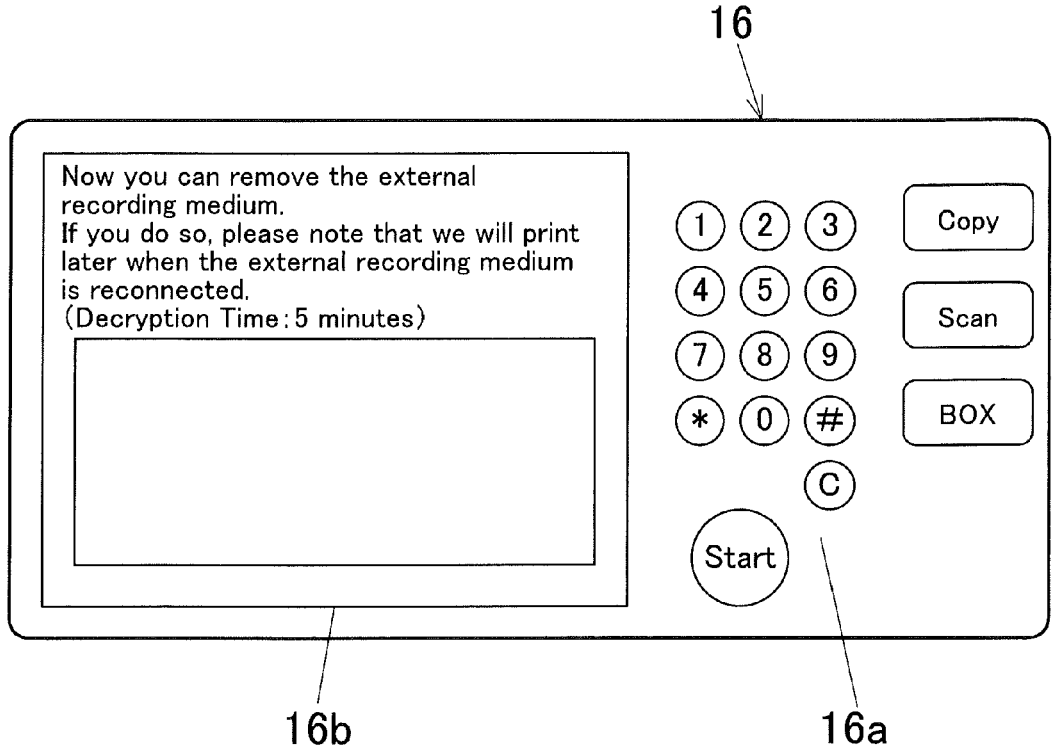
FIG. 12 This is a plain view of the operation panel of the image forming apparatus, displaying a message in the embodiment of FIG. 10.

If all the encrypted shared keys of the user are decrypted and the job administration table is updated (NO in Step S23), then in Step S26, a message is displayed on the display 16b of the operation panel 16, as "now you can remove the external recording medium 3. If you do so, please note that we will print later when the external recording medium 3 is reconnected", as shown in FIG. 12. Alternatively, a message may be displayed thereon as "we will print later when the external recording medium 3 is reconnected", when the external recording medium 3 is detected as being removed.

Then in Step S27, it is judged whether or not there exists any "not decrypted" print data piece of the user, in the job administration table. If there exists any "not decrypted" print data piece of the user (YES in Step S27), the routine proceeds to Step S28.

In Step S28, in the image forming apparatus 1, the print data piece of the user, existing in the job administration table, is decrypted and the job administration table is updated by changing the data in the column "print data: encrypted/not encrypted with shared key" from "encrypted" to "not encrypted", as shown in FIG. 11. And then, the routine goes back to Step S27.

If there exists no "not decrypted" print data piece of the user (NO in Step S27), then it is judged in Step S29, whether or not the user's external recording medium 3 is still connected. If the user's external recording medium 3 is not connected any more (NO in Step S29), the routine terminates. Thus, when the external recording medium 3 is removed, the print data pieces are decrypted but not printed out. If the user's external recording medium 3 is still connected (YES in Step S29), the routine proceeds to Step S30.

In Step S30, it is judged whether or not there exists any decrypted print data piece of the user, in the job administration table. If there exists (YES in Step S30), the print data piece is printed out in Step S31. And then, the routine goes back to Step S29 and repeats Steps S29 through S31 until all the print data pieces of the user, existing in the job administration table, are printed out.

If there exists no print data piece of the user in the job administration table (NO in Step S30), the routine terminates.

As described above, in this embodiment, if the external recording medium 3 is removed after completely obtaining the plurality of decrypted shared keys from the external recording medium 3 and before printing out the print data pieces, the print data pieces are only decrypted with their shared keys, and then properly printed out later when the external recording medium 3 is reconnected. Therefore, for example, even if the user removes the external recording medium 3 and gets off the image forming apparatus 1 for a while, the possibility that the printed content is leaked to third persons can be eliminated and higher security can be ensured.

Hereinafter, yet another embodiment of the present invention will be explained. In the embodiment previously explained with FIG. 10, if the external recording medium 3 is removed after completely obtaining the plurality of decrypted shared keys from the external recording medium 3 and before printing out the print data pieces, the print data pieces are properly printed out later when the external recording medium 3 is reconnected. However, there is a possibility that the decrypted print data pieces are leaked, if the waiting time for reconnection is too long.

To take measures, in the embodiment to be explained below, if there exists a print job not executed yet at a time when a predetermined time has elapsed after the target data piece is decrypted, the print job is discarded.

Figure 13:
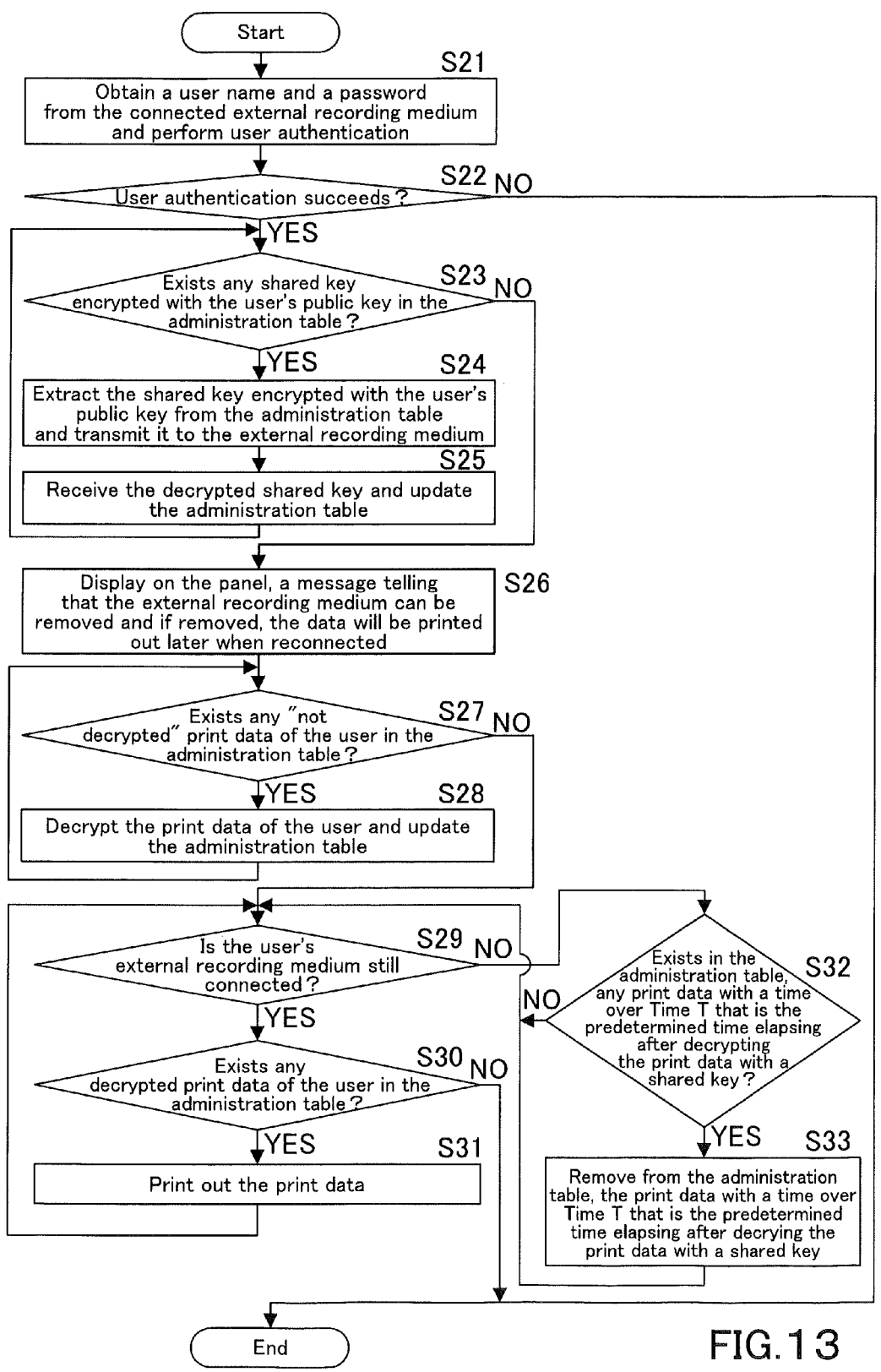
FIG. 13 This is a flowchart representing a procedure that is executed in the image forming apparatus in yet another embodiment of the present invention.

A procedure executed in the image forming apparatus 1 in this embodiment will be described with reference to a flowchart shown in FIG. 13. This procedure is executed by the CPU 11 according to an operation program recorded in a recording medium such as the ROM 17. As referred to FIG. 13, some Steps are exactly the same as those of FIG. 10, thus the same Step numbers S21 through S31 are given to the same Steps, respectively, and detailed explanation thereof will be omitted.

In Step S29, it is judged whether or not the user's external recording medium 3 is still connected. If the user's external recording medium 3 is not connected any more (NO in Step S29), then it is judged in Step S32, whether or not there exists in the job administration table, any print data piece of the user with a time over Time T that is the predetermined time elapsing after the print data piece is decrypted with a shared key.

Referring to the job administration table of FIG. 14, there is a column titled as "time elapsing from decrypting print data with shared key (seconds)". As for the job records of User A, including "print data A001" and "print data A002", the time elapsing from decryption are "600 (seconds)" and "660 (seconds)", respectively.

If there exists no print data piece of the user with a time over Time T (YES in Step S32), the routine goes back to Step S29. If there exists a print data piece of the user with a time over Time T, then in Step S33, the print data piece of the user with a time over Time T that is the predetermined time elapsing after the print data piece is decrypted with a shared key, is removed (discarded) from the job administration table. Then, the routine goes back to Step S29.

As described above, in this embodiment, an unexecuted print job with a time over a predetermined time elapsing from decryption of its print data piece, is discarded. That could eliminate the possibility that the print data piece is leaked if the print job is not executed and thereby the print data piece is unfavorably kept in the image forming apparatus 1 for a long time, and ensure higher security.

Hereinafter, still yet another embodiment of the present invention will be explained. In this embodiment, in addition to an encrypted print data piece and a shared key, a job includes job spec information indicating types of job, encrypted with a shared key. The image forming apparatus 1 decrypts job spec information before decrypting target data pieces, and preferentially decrypts a target data piece of a specific type of job among the types of job indicated by the decrypted job spec information, and then executes the specific type of job.

Figure 15:
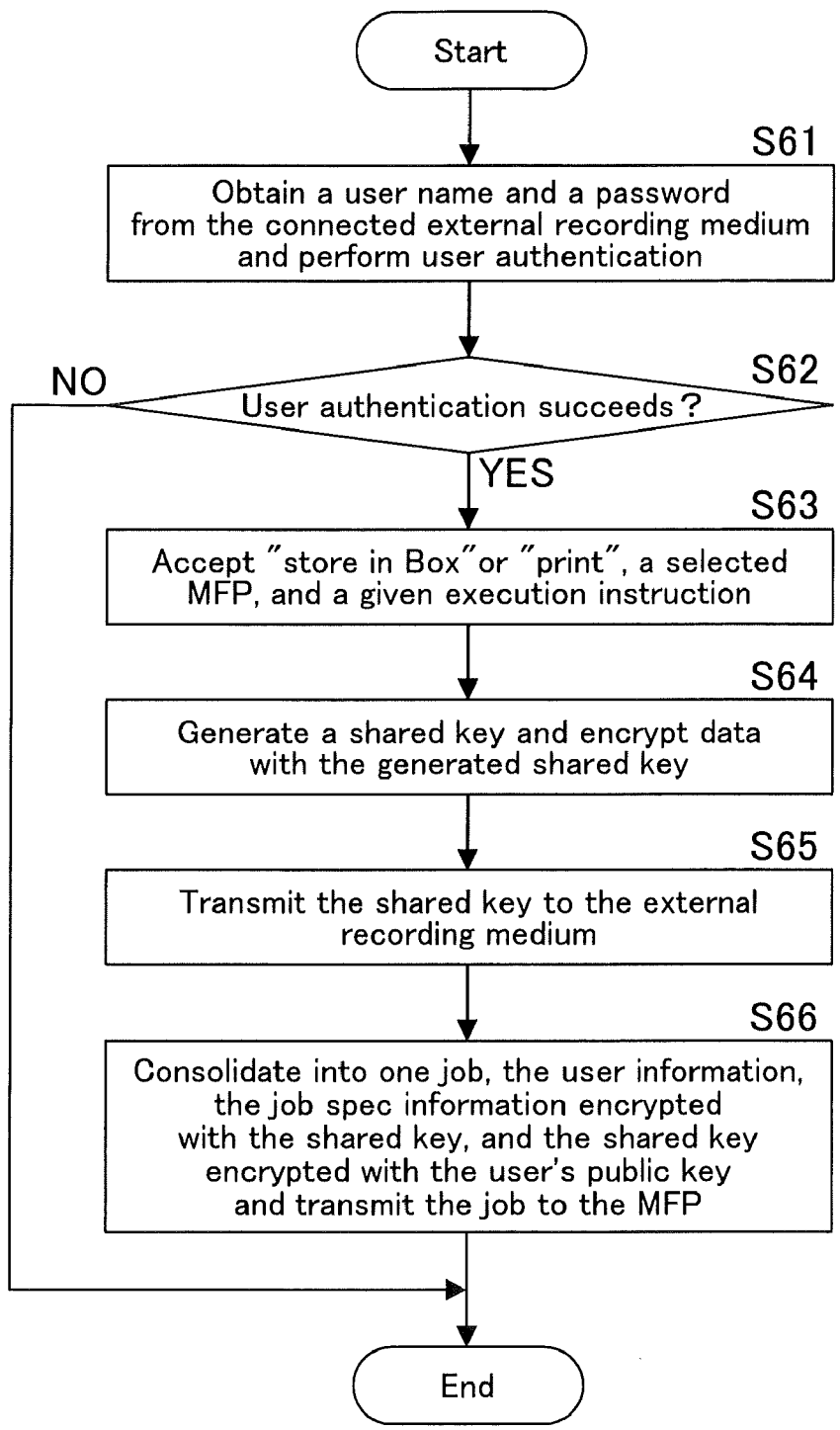
FIG. 15 This is a flowchart representing a procedure that is executed in the client PC in still yet another embodiment of the present invention.

A procedure executed in the client PC 2 in this embodiment will be explained with reference to a flowchart shown in FIG. 15. In this example, the types of job are "print" and "store in Box", but the types of job are not limited thereto.

A user connects the external recording medium 3 to the client PC 2. Then in Step S61, in the client PC 2, a user name and a password are obtained from the external recording medium 3 connected thereto, and user authentication is performed using them.

In Step S62, it is judged whether user authentication succeeds or fails. If user authentication fails (NO in Step S62), the routine immediately terminates. If user authentication succeeds (YES in Step S62), the user selects the image forming apparatus 1 and gives an execution instruction by pressing the execute button, in Step S63.

Then in Step S64, in the client PC 2, a shared key is generated and a target data piece and job spec information are encrypted with this shared key. And the shared key is transmitted to the external recording medium 3, in Step S65.

In the external recording medium 3, the shared key received from the client PC 2 is encrypted with this user's public key held by the external recording medium 3 itself. And then, this encrypted shared key is returned to the client PC 2.

In Step S66, in the client PC 2, the user information, the target data piece and the job spec information encrypted with the shared key, and the shared key encrypted with the user's public key are consolidated into one job as shown in FIG. 16, and the job is transmitted to the image forming apparatus 1. Then the routine terminates.

Referring to FIG. 16, the job owner is User A, and the job spec information encrypted with the shared key is "store in Box", the print data piece encrypted with the shared key is "A001", and the shared key encrypted the user's public key is "shared key A001".

Figure 17:
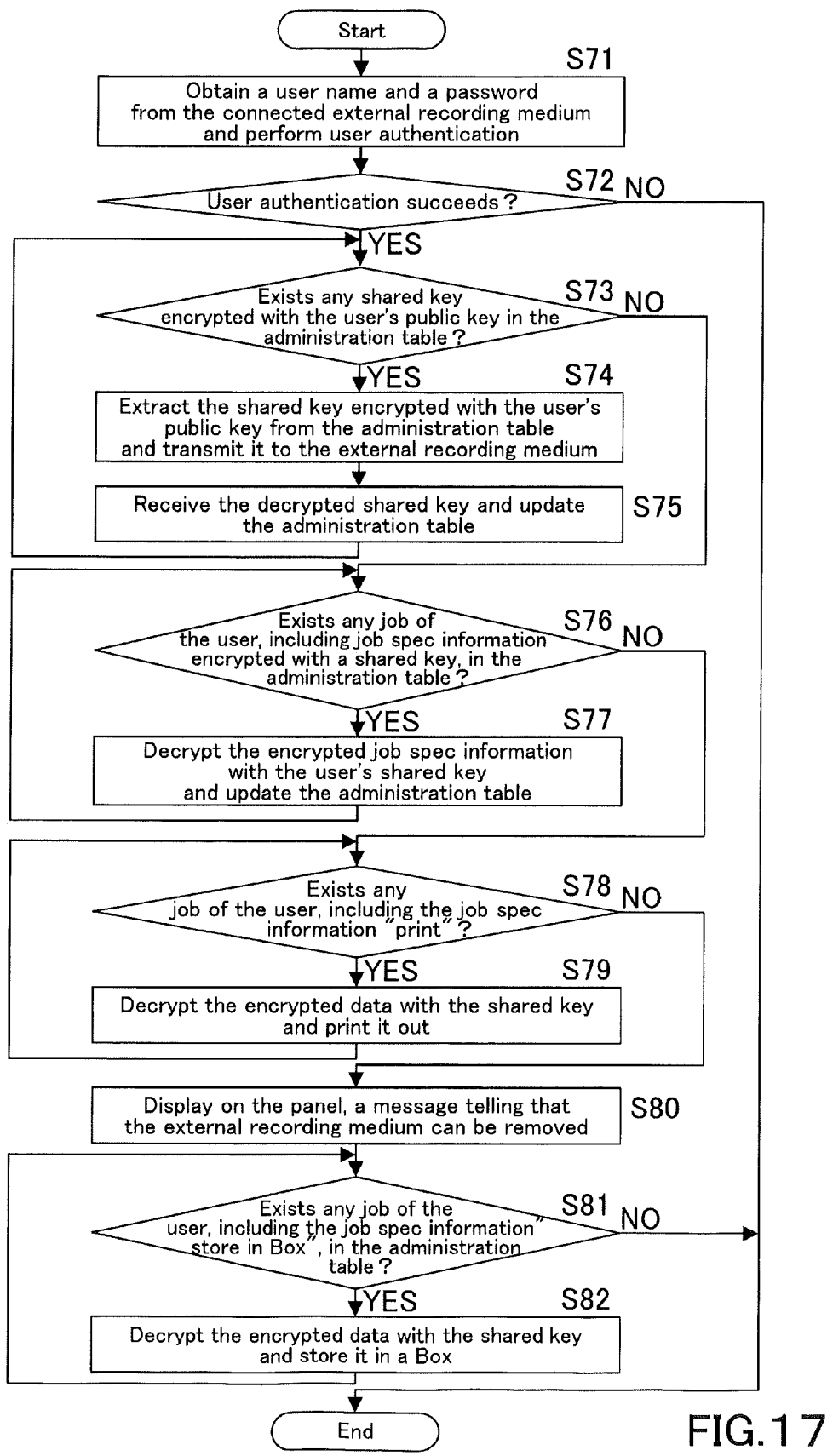
FIG. 17 This is a flowchart representing a procedure that is executed in the image forming apparatus in the embodiment of FIG. 15.

FIG. 17 is a flowchart representing a procedure executed in the image forming apparatus 1. This procedure is executed by the CPU 11 according to an operation program recorded in a recording medium such as the ROM 17.

In the image forming apparatus 1 receiving the job from the client PC 2, information of the job is registered in the job administration table, as shown in FIG. 18.

Referring to the updated job administration table of FIG. 18, there are columns titled as "job spec information" and "job spec information: encrypted/not encrypted with shared key". As for all the job records here, the data in the column "job spec information: encrypted/not encrypted with shared key" is "encrypted".

A user connects the external recording medium 3 to the external recording medium IF 12. Then in Step S71 of FIG. 17, in the image forming apparatus 1, a user name and a password are obtained form the external recording medium 3 connected to the external recording medium IF 12, and user authentication is performed using them.

In Step S72, it is judged whether user authentication succeeds or fails. If user authentication fails (NO in Step S72), the routine immediately terminates. If user authentication succeeds (YES in Step S72), the routine proceeds to Step S73.

In Step S73, it is judged whether or not there exists any shared key encrypted with this authenticated user's public key, in the job administration table. If there exists a shared key encrypted with the user's public key, in the job administration table (YES in Step S73), then in Step S74, in the image forming apparatus 1, the shared key encrypted with the user's public key is extracted from the job administration table and transmitted to the external recording medium 3.

In the external recording medium 3 receiving the encrypted shared key, the encrypted shared key is decrypted with a secret key and this decrypted shared key is returned to the image forming apparatus 1.

Subsequently in Step S75, in the image forming apparatus 1, the decrypted shared key is received, and the data in the column "shared key: encrypted/not encrypted with shared key" of the job administration table is updated as shown in FIG. 19. And then, the routine goes back to Step S73 and repeats Steps S73 through S75.

If all the encrypted shared keys of the user are decrypted and the job administration table is updated (NO in Step S73), then it is judged in Step S76, whether or not there exists any job of the user, including job spec information encrypted with a shared key, in the job administration table. If there exists (YES in Step S76), then in Step S77, the job spec information is decrypted with the user's shared key, and the job administration table is updated by changing the data in the column "job spec information: encrypted/not encrypted with shared key" from "encrypted" to "not encrypted". And then, the routine goes back to Step S76 and repeats Step S76 and S77 until there exists no job of the user, including job spec information encrypted with a shared key, in the job administration table. If there does not exist any (NO in Step S76), the routine proceeds to Step S78

In Step S78, it is judged whether or not there exists any job of the user, including the job spec information "print". If there exists (YES in Step S78), the encrypted print data piece of the job is decrypted with the shared key and printed out, in Step S79. Then, the routine repeats Steps S78 and S79 until there exists no job of the user, including the job spec information "print". If there does not exist any (NO in Step S78), a message telling that the external recording medium 3 can be removed, is displayed on the operation panel 16, in Step S80.

In this way, print jobs are preferentially executed.

Subsequently in Step S81, it is judged whether or not there exists any job of the user, including the job spec information "store in Box". If there exists (YES in Step S81), the encrypted store-in-Box data piece of the job is decrypted with the shared key and stored in a Box, in Step S82. Then, the routine repeats Steps S81 and S82 until there exists no job of the user, including the job spec information "store in Box". If there does not exist any (NO in Step S81), the routine terminates.

This application claims priority to Japanese Patent Application No. 2008-235630 filed on Sep. 12, 2008, the entire disclosure of which is incorporated herein by reference in its entirety.

The terms and expressions provided herein have been employed for the purpose of explaining, never for the purpose of limiting interpretation or eliminating any equivalents of the characteristic objects illustrated or described herein. It should be understood that various other modifications can be made within the range of what the present invention claims

DESCRIPTION OF THE CODES

1 Image Forming Apparatus (Image Processing Apparatus)
2 Client PC
3 External Recording Medium
4 Network
12 External Recording Medium Interface (External Recording Medium Connecter)
13 External Recording Medium Controller
14 Shared Key Controller
15 Network Interface
16 Operation Panel
17 ROM
18 Job Administrator
19 Authenticator
21 Memory

The invention claimed is:

1. An image processing apparatus comprising:
   a job receiver that receives a job including a target data piece encrypted with a shared key and the shared key encrypted with a user's public key, which is transmitted by the user via a terminal connected to a network;
   a job storage that stores the received job;
   an encrypted shared key extractor that extracts from a plurality of target jobs including the received job stored in the job storage, encrypted shared keys included in the respective target jobs;
   an external recording medium connector that removably connects to an external recording medium holding the user's public key and a secret key and having the function for decrypting the encrypted shared key with the secret key;
   a shared key transmitter that transmits a plurality of encrypted shared keys which are obtained as a result of extracting the encrypted shared keys from the respective jobs by the shared key extractor, to the external recording medium connected to the external recording medium connector;
   a decrypted shared key obtainer that obtains from the external recording medium, the plurality of shared keys which are transmitted to the external recording medium by the shared key transmitter and decrypted with the secret key by the external recording medium;
   a target data decryption portion that decrypts the target data pieces with their matching decrypted shared keys, after completely obtaining the plurality of decrypted shared keys from the external recording medium; and
   a job executor that executes the jobs including the decrypted target data pieces.

2. The image processing apparatus recited in claim 1, further comprising:
   an authenticator that performs user authentication, and wherein:
the received job also includes not encrypted user information; and
the encrypted shared key extractor further extracts a job of a user authenticated by the authenticator among the target jobs stored in the job storage, based on the user information included in the received job, and further extracts from the extracted job, the encrypted shared key included therein.

3. The image processing apparatus recited in claim 1, wherein:
if the external recording medium is removed after completely obtaining the plurality of decrypted shared keys from the external recording medium and before executing the jobs including the target data pieces, the target data decryption portion only decrypts the target data pieces with their matching shared keys, and then, if the external recording medium is reconnected, the job executor executes the jobs.

4. The image processing apparatus recited in claim 1, wherein:
if the jobs are not executed within a predetermined period of time after which the target data decryption portion decrypts the target data pieces, those are discarded.

5. The image processing apparatus recited in claim 1, wherein:
the jobs further include job spec information indicating job types, encrypted with the shared keys; and
the target data decryption portion decrypts the job spec information before decrypting the target data pieces, and then decrypts only the target data pieces included in the jobs of a specific job type among the job types indicated by the decrypted job spec information.

6. The image processing apparatus recited in claim 1, wherein:
the job storage has an area created therein to store only the jobs including the target data pieces encrypted with the shared keys.

7. An encrypted job execution method of an image processing apparatus, comprising:
receiving a job including a target data piece encrypted with a shared key and the shared key encrypted with a user's public key, which is transmitted by the user via a terminal connected to a network;
storing the received job in a job storage of the image processing apparatus;
extracting from a plurality of target jobs including the received job stored in the job storage, encrypted shared keys included in the respective target jobs;
transmitting a plurality of encrypted shared keys which are obtained as a result of extracting the encrypted shared keys from the respective jobs, to an external recording medium holding the user's public key and a secret key and having the function for decrypting the encrypted shared keg with the secret key, which is removably connected to an external recording medium connector of the image processing apparatus;
obtaining from the external recording medium, the plurality of shared kegs which are transmitted to the external recording medium and thereby decrypted with the secret key;
decrypting the target data pieces with their matching shared keys, after completely obtaining the plurality of decrypted shared keys from the external recording medium; and
executing the jobs including the decrypted target data pieces by a job executor.

8. The encrypted job execution method of an image processing apparatus, recited in claim 7, further comprising:
performing user authentication,
and wherein:
the received job also includes not encrypted user information; and
a job of a just authenticated user is extracted among the target jobs stored in the job storage, based on the user information included in the job, and the encrypted shared key included in the extracted job is further extracted therefrom.

9. The encrypted job execution method of an image processing apparatus, recited in claim 7, wherein:
if the external recording medium is removed after completely obtaining the plurality of decrypted shared keys from the external recording medium and before executing the jobs including the target data pieces, the target data pieces are only decrypted with their matching shared keys, and then, if the external recording medium is reconnected, the jobs are executed by the job executor.

10. The encrypted job execution method of an image processing apparatus, recited in claim 9, wherein:
if the jobs are not executed within a predetermined period of time after which the target data pieces are decrypted, those are discarded.

11. The encrypted job execution method of an image processing apparatus, recited in claim 7, wherein:
the jobs further include job spec information indicating job types, encrypted with the shared keys; and
the job spec information is decrypted before decrypting the target data pieces, and then only the target data pieces included in the jobs of a specific job type among the job types indicated by the decrypted job spec information, are decrypted.

12. The encrypted job execution method of an image processing apparatus, recited in claim 7, wherein:
the job storage has an area created therein to store only the jobs including the target data pieces encrypted with the shared keys.

13. A non-transitory computer readable recording medium having an encrypted job execution program recorded therein to make a computer of an image processing apparatus execute:
receiving a job including a target data piece encrypted with a shared key and the shared key encrypted with a user's public key, which is transmitted by the user via a terminal connected to a network;
storing the received job in a job storage of the image processing apparatus;
extracting from a plurality of target jobs including the received job stored in the job storage, encrypted shared keys included in the respective target jobs;
transmitting a plurality of encrypted shared keys which are obtained as a result of extracting from the respective jobs to an external recording medium holding the user's public key and a secret keg and having the function for decrypting the encrypted shared key with the secret key, which is removably connected to an external recording medium connector of the image processing apparatus;
obtaining from the external recording medium, the plurality of shared keys which are transmitted to the external recording medium and thereby decrypted with the secret key;
decrypting the target data pieces with their matching shared keys, after completely obtaining the plurality of decrypted shared keys from the external recording medium; and executing the jobs including the decrypted target data pieces by a job executor.

14. The non-transitory computer readable recording medium recited in claim 13, which the program further makes the computer execute:
performing user authentication,
and wherein:
the received job also includes not encrypted user information; and
a job of a just authenticated user is extracted among the target jobs stored in the job storage, based on the user information included in the job, and the encrypted shared key included in the extracted job is further extracted therefrom.

15. The non-transitory computer readable recording medium recited in claim 13, wherein:
if the external recording medium is removed after completely obtaining the plurality of decrypted shared keys from the external recording medium and before executing the jobs including the target data pieces, the target data pieces are only decrypted with their matching shared keys, and then, if the external recording medium is reconnected, the jobs are executed by the job executor.

16. The non-transitory computer readable recording medium recited in claim 15, wherein:
if the jobs are not executed within a predetermined period of time after which the target data pieces are decrypted, those are discarded.

17. The non-transitory computer readable recording medium recited in claim 13, wherein:
the jobs further include job spec information indicating job types, encrypted with the shared keys; and
the job spec information is decrypted before decrypting the target data pieces, and then only the target data pieces included in the jobs of a specific job type among the job types indicated by the decrypted job spec information, are decrypted.

18. The non-transitory computer readable recording medium recited in claim 13, wherein:
the job storage has an area created therein to store only the jobs including the target data pieces encrypted with the shared keys.

19. The image processing apparatus recited in claim 1, further comprising:
a display that displays a message stating that the external recording medium is now ready for being removed from the external recording medium connector, after all the plurality of decrypted shared keys are obtained from the external recording medium.

20. The image processing apparatus recited in claim 3, further comprising:
a display that displays a message stating that the external recording medium is now ready for being removed from the external recording medium connector, after all the plurality of decrypted shared keys are obtained from the external recording medium.

21. The image processing apparatus recited in claim 20, wherein:
the display that displays a message stating that: the external recording medium is now ready for being removed from the external recording medium connector; and the job executor will start executing the jobs when the external recording medium is reconnected to the external recording medium connector.

22. The image processing apparatus recited in claim 1, wherein:
the shared key transmitter sequentially transmits the plurality of encrypted shared keys to the external recording medium; and
the target data decryption portion sequentially decrypts the target data pieces with their matching decrypted shared keys which are obtained.

23. The encrypted job execution method of an image processing apparatus, recited in claim 7, further comprising:
displaying a message stating that the external recording medium is now ready for being removed from the external recording medium connector, after all the plurality of decrypted shared keys are obtained from the external recording medium.

24. The encrypted job execution method of an image processing apparatus, recited in claim 9, further comprising:
displaying a message stating that the external recording medium is now ready for being removed from the external recording medium connector, after all the plurality of decrypted shared keys are obtained from the external recording medium.

25. The encrypted job execution method of an image processing apparatus, recited in claim 24, wherein:
displaying a message stating that: the external recording medium is now ready for being removed from the external recording medium connector; and the job executor will start executing the jobs when the external recording medium is reconnected to the external recording medium connector.

26. The encrypted job execution method of an image processing apparatus, recited in claim 7, wherein:
the plurality of encrypted shared keys are sequentially transmitted to the external recording medium; and
the target data pieces are sequentially decrypted with their matching decrypted shared keys which are obtained.

27. The non-transitory computer readable recording medium recited in claim 13, further making the computer execute:
displaying a message stating that the external recording medium is now ready for being removed from the external recording medium connector, after all the plurality of decrypted shared keys are obtained from the external recording medium.

28. The non-transitory computer readable recording medium recited in claim 15, further making the computer execute:
displaying a message stating that the external recording medium is now ready for being removed from the external recording medium connector, after all the plurality of decrypted shared keys are obtained from the external recording medium.

29. The non-transitory computer readable recording medium recited in claim 28, wherein:
displaying a message stating that: the external recording medium is now ready for being removed from the external recording medium connector; and the job executor will start executing the jobs when the external recording medium is reconnected to the external recording medium connector.

30. The non-transitory computer readable recording medium recited in claim 13, wherein:
the plurality of encrypted shared keys are sequentially transmitted to the external recording medium; and
the target data pieces are sequentially decrypted with their matching decrypted shared keys which are obtained.

* * * * *